United States Patent [19]
Thompson

[11] 3,799,597
[45] Mar. 26, 1974

[54] BUMPER SYSTEM FOR AUTOMOTIVE VEHICLES

[76] Inventor: Maurice J. Thompson, 221 Cambridge Ave., San Leandro, Calif. 94577

[22] Filed: Dec. 29, 1971

[21] Appl. No.: 213,642

[52] U.S. Cl. ................................................ 293/86
[51] Int. Cl. .......................................... B60r 19/08
[58] Field of Search ................................ 293/85, 86

[56] References Cited
UNITED STATES PATENTS

| | | | |
|---|---|---|---|
| 1,739,930 | 12/1929 | Ungar | 293/86 |
| 3,547,469 | 12/1970 | Sancioni | 293/86 |
| 1,733,930 | 10/1929 | Alland | 293/86 |
| 1,526,869 | 2/1925 | Powell | 293/86 |
| 1,449,339 | 3/1923 | Malberti | 293/86 |

Primary Examiner—Gerald M. Forlenza
Assistant Examiner—Robert Saifer
Attorney, Agent, or Firm—Joseph B. Gardner, Esq.

[57] ABSTRACT

A bumper system for automotive vehicles such as trucks, campers, and the like. The bumper system constitutes an impact-absorbing mechanism operative to protect the vehicle against low velocity impacts both at the rear and front ends thereof. The bumper system includes at each end of the vehicle a pair of elongated plungers fixedly secured to the associated bumper and supported by guide structure so as to be reciprocably displaceable with respect thereto. The guide structure is fixedly secured to the chassis of the vehicle, an energy-absorbing structure similarly affixed thereto is provided with a compression spring operatively associated with each plunger and engageable therewith to yieldably resist inward displacements thereof while dissipating kinetic energy associated with any such displacement. Stop means having cooperable components respectively defined by the plungers and guide structures associated therewtih positively limit the permissible outward displacement of the plungers and bumper to positionally define the location thereof in the inactive state of the bumper system.

3 Claims, 5 Drawing Figures

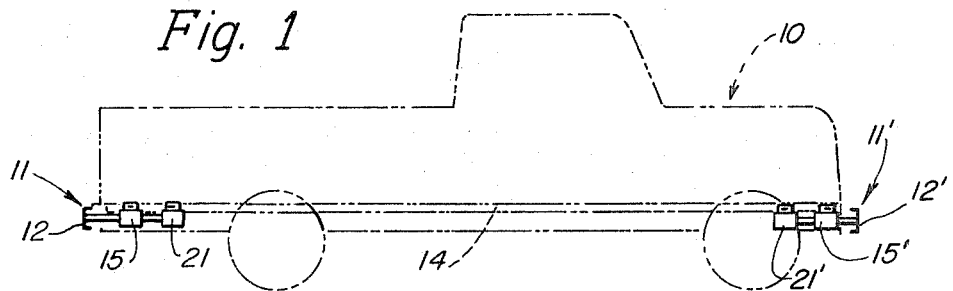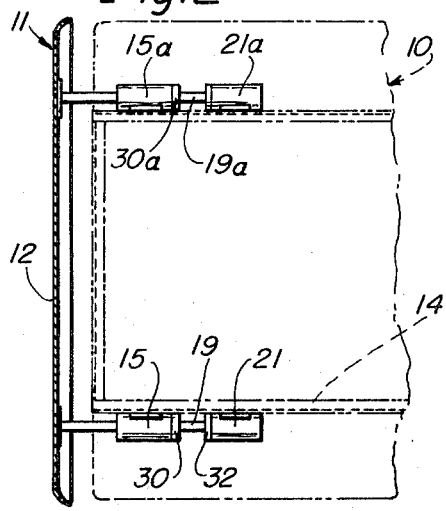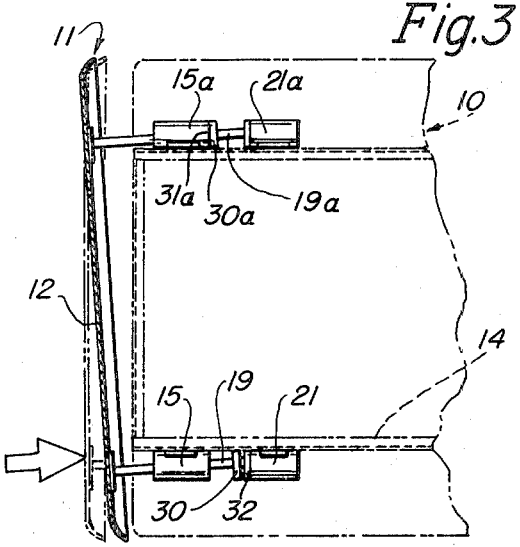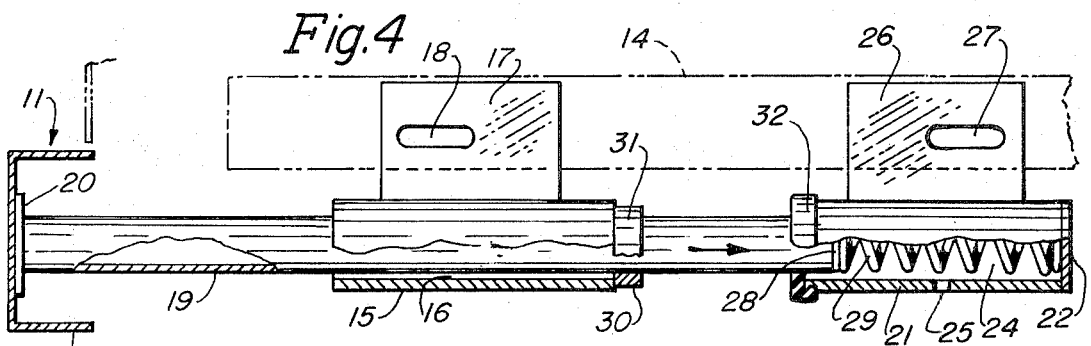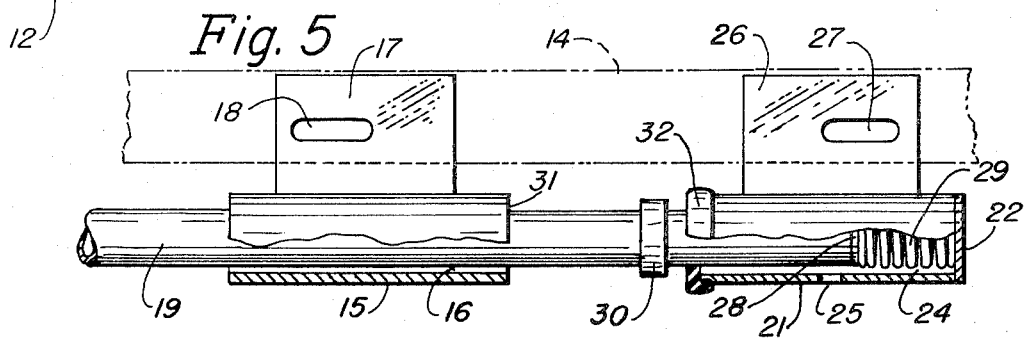

BUMPER SYSTEM FOR AUTOMOTIVE VEHICLES

This invention relates to bumper systems for automotive vehicles and the like and, more particularly, to an impact-absorbing bumper system for trucks, campers, and similar automotive vehicles.

It has now been well established that tremendous automotive repair costs are attributable to damage caused by low velocity impacts occurring at speeds of 10 miles per hour and less. Although collisions between moving vehicles and between any such vehicle and a stationary object occurring at such low velocities are not spectacular and are often not accompanied by personal injury, the total cost of making the mechanical repairs on the vehicles themselves is very substantial and reaches hundreds of millions of dollars a year. Although some insurance companies are offering a reduction in rates for insurance on vehicles able to withstand low velocity impacts without damage, so far as is known, no protective system of commercial significance has been developed.

In view of the foregoing, an object of the present invention is to provide an improved impact-absorbing bumper system for automotive vehicles and the like and, in particular, automotive vehicles such as trucks, campers, and similar vehicles.

Further objects, among others, of the present invention are in the provision of an improved impact-absorbing bumper system of the character described that is structurally simple; relatively inexpensive; easy to install and substantially foolproof in operation; that is readily adapted for use at both the front and rear of the vehicle; that immediately restores itself to its normal inactive condition in which it is ready for a subsequent impact-dissipating cycle following application thereto of an impact force; that permits the bumper to be used in the ordinary manner such as for towing other vehicles; that is able to accommodate asymmetrical impact forces; and that is compatible with vehicles of various structural characteristics, and can be readily adjusted to apply preloads of selected magnitude to the associated bumper.

Additional objects and advantages of the invention, especially as concerns particular features and characteristics thereof, will become apparent as the specification continues.

Considering one particular bumper system in general terms, it includes a bumper fixedly secured to a pair of transversely spaced plungers supported by bracket structure fixedly secured to the chassis of the vehicle and able to accommodate reciprocable displacements of the plungers along the longitudinal axis of the vehicle. Also associated with the plungers are energy-absorbing structures fixedly related to the chassis of the vehicle and engageable with the plungers to yieldably resist inward displacements thereof while dissipating kinetic energy associated with any such inward displacement.

An embodiment of the invention is illustrated in the accompanying drawing, in which:

FIG. 1 is a side view in elevation of an automotive vehicle in the form of a truck, illustrated in outline form by broken lines, equipped at the front and rear thereof with bumper systems embodying the present invention;

FIG. 2 is a top plan view of the rear bumper system shown in FIG. 1, the associated portion of the vehicle being illustrated by broken lines, and in which the bumper system is in its normal inactive state;

FIG. 3 is a top plan view, similar to that of FIG. 2, showing the bumper system in the condition imposed thereon by application thereto of a non-symmetrical impact force, the vehicle again being illustrated by broken lines;

FIG. 4 is an enlarged, side view in elevation of the rear bumper system, with parts broken away to reveal interior structural characteristics, in the normally inactive state thereof; and FIG. 5 is a side view in elevation of the rear bumper system, with parts broken away, similar to that of FIG. 4 but illustrating the condition of the bumper system in an active state immediately following an impact force being applied thereto.

The automotive vehicle illustrated by phantom lines in FIG. 1 is a truck and, in particular, a relatively light-weight vehicle sometimes referred to as a "pick-up" truck. For convenience of subsequent identification, the truck-type vehicle is denoted in its entirety with the numeral 10, and it is seen to be equipped with rear and front bumper systems respectively denoted with the numerals 11 and 11'. As respects the present invention, the two bumper systems may be substantially identical with one being the inverted counterpart of the other, and the following description of the rear bumper system 11 will be understood to apply in all essential particulars to the front bumper system 11'.

Each bumper system 11 includes a transversely extending bumper member 12 that may be completely conventional and, accordingly, may take various forms depending upon the particular manufacturer thereof and the structural characteristics of the vehicle with which it is associated. The typifying bumper 12, as shown best in FIG. 4, is a generally U-shaped channel turned on its side so that the legs thereof are spaced apart vertically and extend inwardly toward the center of the associated vehicle. The bumper 12 serves the usual function of generally protecting the vehicle 10 by accepting the initial impact from other vehicles or abutments striking the truck 10 or being struck thereby. It is therefore customary to form the bumper 12 from steel having a sufficient strength to satisfy the impact-receiving characteristics required thereof, and the bumper may be painted, chrome plated, or otherwise coated and finished in any manner believed to be desirable.

Each of the bumper systems 11 and 11' is most effective when associated with the chassis of the vehicle 10 rather than with the body, running gear or wheel systems thereof, all in accordance with customary practice in the bumper art. In the drawing, various components of the chassis of the vehicle 10 are shown, and the chassis in its entirety is generally denoted with the numeral 14. The chassis 14 is elongated longitudinally, and the center thereof lies along the longitudinal axis of the vehicle 10. As will become apparent hereinafter, the bumper systems 11 and 11' have displaceable components that are movable in directions generally along the length of the vehicle 10 and chassis 14 thereof.

It may also be observed that each bumper system is essentially symmetrical about the center of the chassis 14 or longitudinal axis thereof, and the subsequent description will consider in detail only one side of the bumper system 11 and the same numerals will be used where appropriate to identify the counterpart components constituting the opposite side thereof except that the letter suffix "a" will be used with the latter components for purposes of differentiating one side of the vehicle and bumper components from the other.

Referring to FIGS. 4 and 5 in particular, the bumper system 11 includes guide structure 15 adapted to be fixedly secured to the chassis 14 of the vehicle 10 at a predetermined location therealong. The guide structure 15 in the form shown is a hollow cylindrical tube having a cylindrical bore or passage 16 extending therethrough in a longitudinal direction. Extending upwardly from the cylindrical tube is a bracket 17 that may be welded or otherwise rigidly related thereto, and the bracket 17 is essentially a flat plate-like member adapted to be placed along the chassis 14 in contiguous juxtaposition therewith. The bracket 17 may be welded or otherwise secured to the chassis 14 as by means of bolts (not shown) extending through a longitudinally elongated opening 18 provided in the plate and alignable with one or more bolt-receiving apertures cut in the chassis 14 and not illustrated herein.

The bumper system 11 further includes an elongated plunger 19 supported by the guide structure 15 for reciprocable displacements with respect thereto generally inwardly and outwardly along the length of the chassis 14 and vehicle 10. The plunger 19 is a hollow tubular component of cylindrical cross section extending through the passage 16 of the guide structure. The passage 16 is somewhat larger in diameter than the plunger 19 so as to define a loose fit therebetween for purposes to be noted hereinafter. At its outer end, the plunger 19 is secured to the bumper 12; and in the particular system being considered, the plunger has a mounting plate 20 welded thereto which is then bolted, riveted, welded or otherwise fixedly attached to the bumper along the interior thereof.

The bumper system 11 still further includes energy-absorbing structure 21 adapted to be fixedly related to the chassis 14 of the vehicle 10 and engageable with the plunger 19 to yieldably resist inward displacements thereof while dissipating kinetic energy associated with any such inward plunger displacement. The energy-absorbing structure 21 is in the form of a cylindrical tube having an end wall 22 closing the same at one end and forming with the sidewall a chamber 24 that is open at its opposite end so as to slidably receive the inner end portion of the plunger 19 therein. The diameter of the chamber 24 is greater than the diameter of the plunger 19 so that a somewhat loose fit is formed therebetween for purposes discussed hereinafter. A small aperture or weep hole 25 formed in the lower surface of the structure 21 permits moisture to drain therefrom.

The energy-absorbing structure 21 is adapted to be fixedly related to the chassis 14 of the vehicle 10, and for this purpose it includes a bracket 26 extending upwardly from the tubular shell of the structure 21 that may be welded or otherwise rigidly related thereto. The bracket 26 is essentially a flat plate-like member adapted to be placed along the chassis 14 in contiguous juxtaposition therewith. The bracket 26 may be welded or otherwise secured to the chassis 14 as by means of bolts (not shown) extending through a longitudinally elongated opening 27 provided in the plate and which opening is alignable with one or more apertures (not illustrated) cut in the chassis 14.

The energy-absorbing structure 21, as previously noted, includes means for yieldably resisting inward displacements of the plunger 19 while dissipating kinetic energy associated with any such inward displacement, and for this purpose spring means are included that operate between the inner end wall 28 of the plunger and closure wall 22 of the structure 21. In the system under consideration, the spring means comprise a mechanical spring and, more specifically, a helical compression spring 29 although fluid springs and especially air or other gaseous fluid springs can be employed. The spring 29 is a Hooke's Law spring so that the magnitude of the forces of restoration developed thereby progressively increases with the extent of the spring deformation. The energy-absorbing structure 21 is structurally separated from the guide structure 15 in the particular embodiment of the invention being considered, thereby enabling the spacing between these two structures to be varied so as to provide a spring preloading of selected magnitude and to thereby establish the permissible maximum displacements of the plunger 19, as explained further hereinafter.

The bumper system 11 also includes stop means having cooperative components effectively operable between the plunger 19 and chassis 14 to positively limit the permissible outward displacement of the plunger. In this reference, the stop means shown includes a collar 30 pinned or welded to the plunger 19 in coaxial circumjacent relation therewith so as to be rigidly secured thereto. The stop means further includes an end wall 31 of the guide structure 15 which is adapted to be abutted by the collar 30 in the normal inactive position of the bumper system, as shown in FIGS. 2 and 4. The collar 30 may also abut a cushion 32 provided at the outer end of the cylindrical shell of the energy-absorbing structure 21 so as to establish the maximum inner position of the plunger 19 when displaced inwardly by impact energy applied thereto, as shown in FIG. 3. The cushion 32 is a resilient pad of rubber or plastic and prevents hard metal-to-metal impact should the plunger 19 be displaced to its maximum position.

In use of the impact-absorbing bumper system 11, the chamber 12 thereof normally has the configuration illustrated in FIGS. 2 and 4 in which each plunger 19 is displaced rearwardly to its maximum extent by the biasing force of the associated spring 29 which seats each abutment 30 in positive engagement with the end wall 31 of the related guide structure 15. Accordingly, the bumper 12 in the inactive condition thereof has a positive positional relationship with respect to the chassis 14 and entire vehicle 10. Further, since the normal inactive position of the bumper 12 is positively established, the bumper can be used for towing purposes in the customary manner. In this respect, any resistive force applied to the bumper 12 (toward the left, as viewed in FIGS. 2 and 4, such as if the vehicle 10 were towing another vehicle) will be transmitted directly to the chassis 14 through the plungers 19, guide structures 15, brackets 17, and metal-to-metal contact defined between each abutment 30 and associated guide structure surface 31.

In the event that an impact occurs against the bumper 12, one or both of the plungers 19 will be displaced inwardly against the resistive force of the springs 29, thereby attenuating or dissipating in the form of mechanical work and heat all or a portion (depending upon the magnitude) of the kinetic energy incident to such impact force and the consequent inward displacement of the bumper 12 and plungers 19. That is to say, if the impact force applied against the bumper 12 is generally symmetrical and does not exceed the maximum resistive force of the springs 29, each plunger 19 will be displaced inwardly by substantially the same amount and the assemblage will have the configuration generally illustrated in FIG. 5 in which each abutment 30 is intermediate the end wall 31 of the guide structure and cushion 32 and is spaced from each other. As soon as the force causing such displacement is released, the springs 29 return the plungers 19 and bumper 12 to the normal inactive positions thereof shown in FIGS. 2 and 4.

In the case of the impact force having a magnitude sufficient to displace the bumper 12 and plungers 19 inwardly to their maximum extent, each abutment 30 will engage the associated cushion 32 and that portion of the impact force not dissipated in spring compression will be transferred to the chassis 14 via the abutments 30, cushions 32, structures 21, and brackets 26. However, the resilience of each cushion 32 will tend to dissipate somewhat the magnitude of any such portion of the force and, in any case, sharp metal-to-metal contact is prevented by the presence of the cushions 32. The bumper 12 and plungers 19 will be restored to their normal inactive positions by the springs 29 whenever such large-magnitude force is removed.

In many instances (perhaps most), an impact occurring along the bumper 12 will not be symmetrically oriented relative thereto, and as a consequence thereof the bumper and its associated plungers 19 and 19a will not be symmetrically displaced because the plunger receiving the greater magnitude of the impact force will be displaced inwardly to a greater extent than the other. The maximum asymmetrical force application is illustrated in FIG. 3 in which the plunger 19 is displaced inwardly to the greatest permissible extent in which the abutment 30 is in engagement with the cushion 32, but the plunger 19a is substantially undisturbed so that the abutment 30a associated therewith is in engagement with the end wall 31a of the guide structure 30a. Upon removal of the impact force causing such asymmetrical displacement of the bumper system, the bumper 12 and plunger 19 will be returned to their inactive positions shown in FIG. 2.

The bumper system 11 is able to accommodate asymmetrical force applications thereto because the passage 16 in each guide structure 15 is substantially larger in diameter than the plunger 19, and this same dimensional relationship is repeated as respects the chamber 24 in each energy-absorbing structure 21 and the plunger 19. Accordingly, each plunger 19 is able to cant or articulate generally about the position of the end wall 28 thereof within the limits defined by the clearances within the associated passage 16 and chamber 24. These dimensional relationships may be selected to be adequate to permit a maximum displacement of one plunger 19 with essentially no accompanying displacement of the other, as shown in FIG. 3. This arrangement is of considerable significance because symmetrical impact force applications to the bumper 12 cannot be expected.

Although the guide structure 15 and energy-absorbing structure 21 could be integrated and corresponding changes made in the stop arrangement, separation of these components as shown in the drawing is convenient in that it readily enable the bumper system to be adapted with minimum difficulty to the structural peculiarities of any vehicle. Further, although springs 29 having any suitable force characteristics can be included in the apparatus, the particular arrangement illustrated and described permits change to be made readily in the preloading applied by the spring 29 to the plungers 19. In this reference, it will be apparent that the magnitude of any preload is increased by positioning the structure 21 and bracket 26 associated therewith in closer proximity to the guide structure 15 and its bracket 17, and that increasing the spacing between the components reduces the magnitude of any preloading applied by the springs to their respectively associated plungers. The brackets 17 and 26 may be temporarily or permanently affixed to the chassis 14 by bolts (not shown) or welded thereto either initially or after being supported for adjustment and alignment purposes by bolts extended through the slots 18 and 27.

The precise dimensional relationships that can be provided in any particular embodiment of the bumper system will depend upon the environment and any specific parameters imposed thereby. However, for purposes of providing a general order of magnitude for one particular embodiment of the invention, the following dimensions may be considered: the passage 16 of the guide structure 15 and compartment 24 of the energy-absorbing structure 21 are each cylindrical in cross section and have an inner diameter of about 2½ inches; the plunger 19 associated therewith is a hollow cylindrical tube having a diameter of about 2 inches; and the distance between the facing surfaces of the abutment 30 and cushion 32 is approximately 5¾ inches. The spring 29 is a helical compression spring selected to permit the plunger 19 to be displaced inwardly through a distance of approximately 3 inches when a pick up truck (a standard American made 1970 3 quarter ton truck weighing approximately 4,000 pounds) embodying such bumper system is driven into a stationary, immovable abutment at a velocity of about 15 miles per hour. Following such impact, the bumper system having the dimensions stated immediately restored itself to its normal inactive conditon. With the dimensions stated, the plunger 19 still had sufficient room to be displaced inwardly for a further distance of approximately 2 inches before the abutment 30 would engage the cushion 32.

Similar test impacts have been made with correspondingly advantageous results using two such standard trucks each moving at a velocity of about 10 miles per hour toward each other into collision. It has also been found that the passengers in such vehicles appear to be protected against whiplash during such impacts.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In an impact-absorbing system for an automotive vehicle or the like, axially extending hollow guide structure formed for attachment to the chassis of such vehicle, an elongated plunger supportable by said guide structure for reciprocable axial displacements with respect thereto generally inwardly and outwardly along the length of such vehicle and adjacent one end being adapted to be secured to the vehicle bumper to support the same for reciprocable displacements therewith, axially extending hollow energy-absorbing structure separate from said guide structure and adapted to be fixedly secured to the chassis of such vehicle and engageable with said plunger to yieldably resist inward displacements thereof while dissipating kinetic energy associated with any such inward displacement, and stop means including an abutment fixedly secured to said plunger and interposed between said guide structure and said energy-absorbing structure, thereby establishing the maximum permissible displacement of said plunger in opposite axial directions, said guide structure and said energy-absorbing structure being selectively engageable by said abutment upon such maximum plunger displacements to positively limit both the permissible outward and inward displacements of said plunger.

2. The bumper system of claim 1 and further including a bumper and an additional plunger, each of said plungers being fixedly secured to said bumper in spaced-apart transverse relation therealong, and still further including an additional guide structure, an additional energy-absorbing structure separated from said guide structure, and an additional stop means including an abutment fixedly secured to said additional plunger and disposed between said additional guide and energy-absorbing structures, said additional guide and energy-absorbing structures being respectively attachable to the chassis of such vehicle.

3. The system of claim 2 and further including a vehicle chassis, each of said guide structures and each of said energy-absorbing structures being fixedly secured to said chassis, and each of said plungers being supported by the associated guide structure for reciprocable axial displacements generally along the length of said chassis.

* * * * *